United States Patent [19]

Leask et al.

[11] 4,250,392

[45] Feb. 10, 1981

[54] BI-FOCAL COLLIMATOR

[75] Inventors: John W. Leask, Carlisle; John C. Leask, Dunstable; Harry W. Straus, Newton Centre, all of Mass.

[73] Assignee: Engineering Dynamics Corporation, Lowell, Mass.

[21] Appl. No.: 15,598

[22] Filed: Feb. 27, 1979

[51] Int. Cl.³ .......................... G02B 5/00; G01T 1/20
[52] U.S. Cl. ................................ 250/505; 250/363 S
[58] Field of Search ................ 250/363 R, 363 S, 505, 250/510, 511

[56] References Cited

U.S. PATENT DOCUMENTS

| | | | |
|---|---|---|---|
| 3,988,585 | 10/1976 | O'Neill et al. | 250/505 |
| 3,997,794 | 12/1976 | York et al. | 250/511 |
| 4,048,505 | 9/1977 | Hounsfield | 250/505 |
| 4,079,259 | 3/1978 | Blum | 250/505 |

Primary Examiner—Alfred E. Smith
Assistant Examiner—Janice A. Howell
Attorney, Agent, or Firm—Russell & Nields

[57] ABSTRACT

A collimator suitable for use in the creation of more than one miniaturized image of a radioactive concentration simultaneously by a radiation receiving and imaging device, said collimator having at least two adjacent collimating sections separated by areas substantially opaque to radiation from the radioactive object, each such collimating section being a grid-like arrangement of wall portions, adapted to absorb substantially all radiation from the radioactive object which impinges thereon, extending between the top surface and the bottom surface of the collimator defining a plurality of holes therebetween of substantially any desired cross-sectional shape. The wall portions and associated holes of each collimating section are so disposed relative to each other that radiation from the radioactive object passing through the holes from the bottom to the top of the collimator will converge upon a point on a line passing through the center of the top surface of the collimating section located at an acute angle to a line normal to the center of the top surface of that collimating section. Two limitations must be adhered to. First, care must be taken in selecting the angle at which each collimating section converges to avoid interference between or among the image creating radiation rays emerging from the various collimating sections, and second each collimating section must contain sufficient wall portions to provide adequate selection of image creating radiation from the continuum of radiation radiated by the object and impinging upon the bottom surface of each section to allow the creation of a useable image.

8 Claims, 3 Drawing Figures

U.S. Patent     Feb. 10, 1981     4,250,392
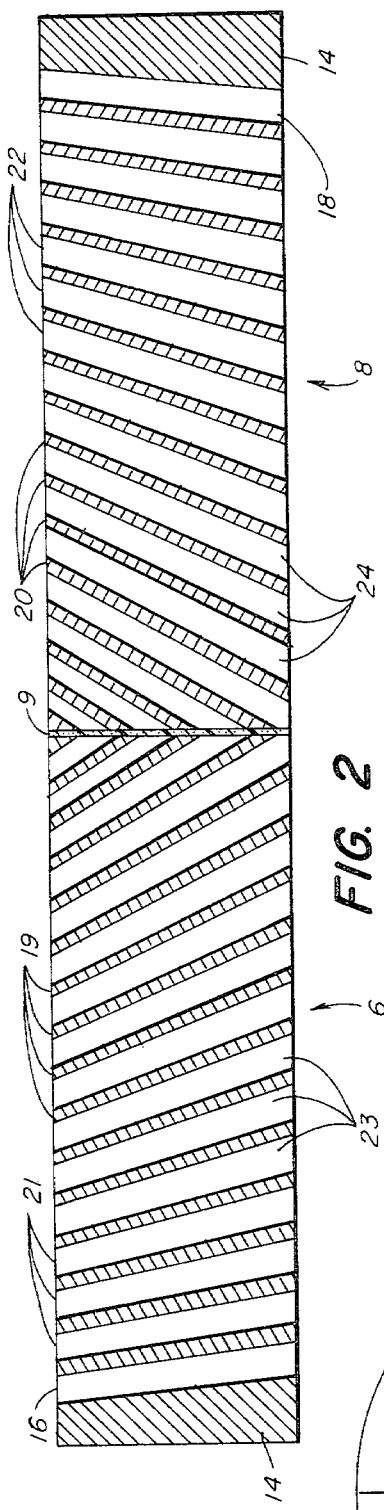
FIG. 2
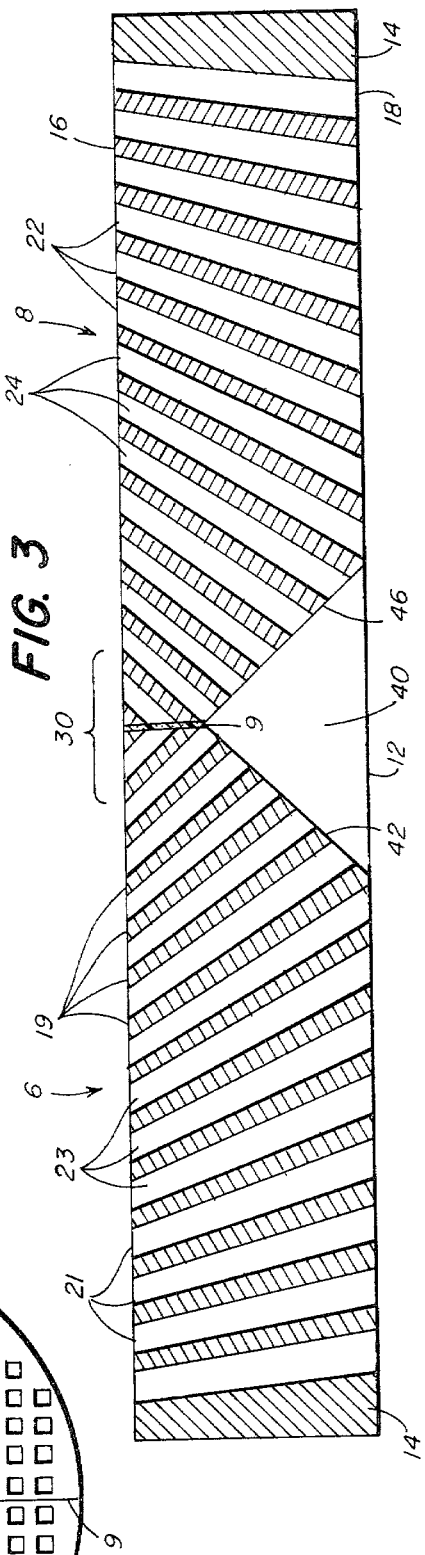
FIG. 3
FIG. 1

BI-FOCAL COLLIMATOR

BACKGROUND OF THE INVENTION

1. Field of Invention

This invention relates in general to grid-like structures of the type suitable for use as collimators for shielding radiation receiving and imaging devices from the effects of distorting radiation, and more particularly to structures of the above type suitable for use in the provision more than one image of a given radioactive object at the same time.

2. Summary of the Prior Art

The use of grid-like structures formed of lead or some other material opaque to radiation as collimators in conjunction with various forms of radiation receiving and imaging equipment has been well known in the art for many years. One example of such use is the Anger camera, which is a special type of radiation receiver used by the medical profession to locate and judge the extent of diseased tissue within a patient's body by the creation of photograph-like images of radioactive concentrations therein. Recent advances have indicated that not only will radioactive material administered to a patient tend to collect in diseased tissue and thus be imagable, but also that such material travelling in the blood stream and through the various organs of a patient's body is also imagable so as to provide, particularly if used with a computer facility, a continuous series of images which together reveal the operation of a given organ. In each case, because of the peculiar fact that the object to be imaged is its own source of radiation, unlike the case of conventional or even x-ray photography, collimators have been invaluable tools for the selection from all the rays emanating from the radioactive concentration in all directions those rays which when allowed to reach the radiation receiving and imaging device will produce an undistorted image of the radioactive concentration.

Several types of collimators are known including the standard type wherein the walls of the grid-like structure and the holes defined thereby are all parallel and normal to the imaging crystal (image same size as radioactive concentration), those wherein the grid-like arrangements of walls and holes defined thereby either converges, or diverges, relative to a point on a line normal to the surface of the collimator (image either minaturized or enlarged relative to the actual size of the radioactive concentration), and the slant type wherein the walls and holes defined thereby are all parallel but are at an acute angle to the crystal (image same size as radioactive concentration). In addition, many hole shapes have been developed for and used in such devices, and many methods of collimator construction have been developed including modularization, and the design of special tooling for quantity manufacturing. The fact has remained, however, that collimator technology has imposed undesirable limitations upon the diagnostic capabilities of presently available radiation receiving and imaging devices.

For example, normally the radiation receiving and imaging device is located above the table or bed upon which the patient lies on his back, the radiation sensitive member (crystal) of the radiation receiving and imaging device and the bed/table defining two substantially parallel planes, however, it has been demonstrated in nuclear cardiac diagnosis that a view of the heart taken at approximately 30° to a line normal to the plane of the bed/table provides a particularly useful and desirable view of the chambers, valves, and major blood vessels of the heart muscle. Using a standard parallel hole collimator, whose holes are normal to the camera crystal, to take this view, commonly called the Left of Right Anterior Oblique, is difficult because the camera must be positioned behind the patient's shoulder, and the resulting image is less than optimum due to the distance and the amount of tissue and bone through which the rays must pass prior to reaching the camera. The use of a slant type collimator whose holes are at an angle with respect to a line normal to the camera crystal has been found to be capable of yielding an image which closely approximates the conventional anterior oblique without the need to position the camera behind the patient's shoulder.

It has also been noted, again particularly in nuclear cardiac diagnosis, that simultaneous views of an internal human organ taken at different angles are an invaluable diagnostic tool, especially in cases wherein the physician needs as much information as possible as fast as possible. This is true not only in evaluating damage, say from a myocardial infarction, but also in examining present function, say by gated blood pool studies. As a practical matter many physicians in the field have endeavored to approximate the benefits of simultaneous imaging by serial multiple projections, that is taking a first view and then reorienting the patient, camera, or both before taking a second view. This practice, while useful, is not totally satisfactory because, among other reasons, there is a significant time delay between views and it is extremely difficult to achieve exact anatomical and geometric correlation between views so created. Only simultaneous imaging can effectively erradicate these problems.

Heretofore, simultaneous image studies have been possible only by the use of multiple radiation receiving and imaging devices using standard parallel hole type collimators or by the use of large field of view cameras fitted with a bi-lateral collimator. A bi-lateral collimator is one having two collimating sections, each section being essentially a separate slant type collimator. By making the angle of slant of each section of such a bi-lateral collimator with respect to a line normal to the camera crystal the same, for example, 30° to the right of normal for the right hand section and 30° to the left of normal for the left hand section, it is possible to create two simultaneous images of the radioactive concentration which convey relatively precisely correlated information in terms of time and space.

Such bi-lateral collimators are restricted in practical use. They allow multiple angular views of a radiation concentration to be created simultaneously on the same camera crystal, but they require large field of view cameras, (i.e., a large radiation sensitive member, commonly known as the crystal). For instance, in order to create two simultaneous views of the heart, which is about 15 cm in diameter, it is necessary using a bi-lateral collimator to provide a camera crystal approximately 15 inches in diameter. A camera of this size is simply too large and unwieldy to be considered portable and practically useable in an intensive care unit setting. The largest camera crystal which would allow its camera to be portable enough in an intensive care unit is about 10 inches. A large amount of imaging is done in intensive care units under rather severe time restrictions, especially in cardiac cases. Consequently, portability is a prime concern for any imaging system and as can be readily seen from the above collimator design can have a large effect upon imaging unit size.

SUMMARY OF THE INVENTION

The present invention provides a collimator suitable for use in the creation of more than one image of a radioactive concentration simultaneously, each image corresponding to a different angular view of the radioactive concentration, by a radioaction receiving and imaging device small enough to be considered portable and of practical utility in an intensive care unit environment. More specifically, the present invention contemplates a collimator having at least two adjacent collimating sections separated by areas substantially totally opaque to radiation from the radioactive object, each such collimating section being a grid-like arrangement of wall portions, adapted to absorb substantially all radiation from the radioactive object which impinges thereon extending between the top surface and the bottom surface of the collimator defining a plurality of holes therebetween of substantially any desired cross-sectional shape. It is further contemplated that the wall portions and associated holes of each collimating section will be so disposed relative to each other that radiation from the radioactive object passing through the holes from the bottom to the top of the collimator will converge upon a point on a line passing through the center of the top surface of the collimating section located at an acute angle to a line normal to the center of the top surface of that collimating section. These are additionally two limitations which must be adhered to. First, care must be taken in selecting the angle at which each collimating section converges to avoid interference between or among the image creating radiation rays emerging from the various collimating sections, and second each collimating section must contain sufficient wall portions to provide adequate selection of image creating radiation from the continuum of radiation radiated by the object and impinging upon the bottom of the section to allow the creation of a useable image.

It is thus an object of the present invention to provide a collimator suitable for use in creating multiple simultaneous miniaturized images from differing angular perspectives of a radioactive concentration simultaneously upon a crystal of a radiation receiving and imaging device which may be smaller than the crystals that have heretofore been required in the creation of multiple, simultaneous images of a radioactive concentration.

It is also an object of the present invention to provide a collimator of the above type which may be made interchangable with the collimators of radiation receiving and imaging devices presently in general use.

Further, it is an object of the present invention to provide a collimator of the above type with sufficient inherent adaptability that substantially all known hole shapes and grid wall thicknesses may be used in order to achieve optimum image characteristics for all objects, shapes and radioactive energy levels.

Still further, it is an object of the present invention to provide a collimator of the above type which allows substantially full use of the radiation receiving and imaging device's detector and the creation of at least two simultaneous views having exactly the same geometrical and anatomical relationship at the same instant of physiological time.

BRIEF DESCRIPTION OF THE DRAWINGS

These, as well as other features, objects, and advantages of the present invention, will be more clearly understood by reference to the following detailed description of the preferred embodiment of the present invention and to the drawings in which:

FIG. 1 is a plane view of an assembled collimator in accordance with the present invention suitable for use with an Anger camera or other radiation receiving and imaging device;

FIG. 2 is an enlarged diagrammatic cross-sectional view of the collimator of FIG. 1 taken normal to the line 2—2 and, FIG. 3 is an enlarged diagrammatic cross-sectional view of a modification of the collimator of FIG. 2 in accordance with the present invention.

DESCRIPTION OF PREFERRED EMBODIMENT

In providing a collimator as shown in FIG. 1 suitable for use in the provision of multiple, simultaneous, angular views of a radioactive concentration with an Anger camera or other radiation receiving and imaging device having a small enough field of view that the unit can be considered portable in a hospital environment the present invention specifically recognizes that convergent collimators are known to reduce image size, and that slant type collimators have been used to approximate views such as the left or right anterior oblique without the orientation problems that are inherent in such views using standard collimators. The combination of these concepts has until the present invention remained impossible as a practical matter because collimators convergent upon a point located at an angle other than normal to the center of their surface were simply unavailable except perhaps as custom made units. We have solved this technical problem and accordingly combined the above concepts herein.

Referring now specifically to the drawings, wherein like reference numerals are used to designate like elements throughout and particularly to FIG. 1, there is shown a collimator, generally indicated at 4, in accordance with the present invention basically comprised by two collimating sections, 6 and 8 respectively, separated by an adhesive bonding joint 9. The joined collimating sections are disposed within a frame 12, which may be of substantially any desired shape, sutiable for mounting the collimator appropriately relative to the imaging crystal of the radiation receiving and imaging device to be used, and are locked in place by lead or some other material opaque to the radiation to be used in the area 14 between the joined collimating sections and the frame. The collimating sections 6 and 8 themselves are grid-like structures formed by lead or some other material opaque to radiation. The internal construction of collimators in accordance with the present invention will be best understood with reference to FIGS. 2 and 3.

FIG. 2 shows an enlarged diagrammatic view of a cross-section of collimator 4 of FIG. 1 taken normal to the line 2—2 wherein the collimator surface intended to be adjacent to the camera crystal in use is designated 16 and the collimator surface intended to face the radioactive concentration in use is designated 18. Surfaces 16 and 18 need not be planar, however, as they normally will be planar we have so depicted them for purposes of illustration herein.

Extending between surface 16 and surface 18 the grid-like structures of collimating sections 6 and 8 respectively appear in cross section as a series of wall portions 19 and 20 respectively which with back portions 21 and 22 respectively define a series of channels 23 and 24 respectively. The relationship of these walls and channel within each collimating section is unique. Instead of the conventional parallel hole standard or slant type collimator, or the common convergent/divergent collimator, the present invention contemplates a relationship of wall portions and holes defined thereby which results in each collimating section becoming a separate collimating unit capable of forming its own image of the viewed radiation concentration on the camera crystal. Each section is focused on a point on a line passing through the center of that portion of surface 16 of collimator 4 corresponding to the section located at an acute angle to a line normal to the center of that portion of surface 16 of collimator 4 corresponding to that section. Obviously, some care must be exercised in selecting this point in order to be sure that there is no interference between or among the images thus creatable on the camera crystal. The wall thicknesses and hole sizes of the grid of each collimating section when viewed from either surface 16 or surface 18 are thus not uniform, and, as is clear from FIG. 2, the wall portions 19 and 20 and channels 23 and 24 extend at various angles from surface 16 to surface 18 and expand in cross-sectional width as they do so. Similarly, areas 14 expand in cross-sectional width as they extend from surface 16 to surface 18. The precise relationships and relative dimensions of the wall portions and channels in each collimating section will vary according to the energy level to be shielded against and the angle at which each section is designed to converge. It will be understood by those skilled in the art that the above described juxtaposition of two or more separately convergent/divergent collimating sections provided a capability of creating multiple, simultaneous, miniaturized images upon the imaging crystal of a radiation receiving and imaging device. It will also be seen from FIG. 2 that depending upon the distance between surface 16 and the imaging crystal in use the images creatable with such a collimator will always be separated and that the minimum distance of such separation will be equal to the distance 30 corresponding to the open end of the V-shaped section defined by those walls 19 and 20 which abut the joint 9 adjacent to surface 18, because the V-shaped portion so defined will be substantially totally opaque to radiation. Of course, depending upon the composition of the adhesive material used to form the joint 9, the joint 9 may or may not be permeable to radiation from the radioactive object, however, as only that radiation impinging upon the area where the joint abuts surface 18 which is in the same plane as the plane containing the joint will pass through the collimator to the crystal, such radiation will not interfere with the images. Accordingly, substantially any adhesive material which will maintain joint 9 substantially permanent in use is contemplated to be suitable for use in the present invention.

We have found that so long as the angle of convergence of each collimator section is small, that is on the order of 15°-25°, the goals of the present invention can be well achieved. If, however, the desired angle of convergence is larger than the above the required field of view, and thus crystal size, of the radiation receiving and imaging device tends to become large and unweildy because the spaces between images become greater as the respective angles of convergence increase. To accommodate these restrictions upon the embodiment of this invention shown in FIG. 2, we have developed a modification thereof which will be best understood by reference to FIG. 3.

As was the case with respect to FIG. 2, FIG. 3 shows an enlarged diagrammatic view of a cross-section of a collimator similar to that shown in FIG. 1 taken normal to a line corresponding to the line 2—2 shown therein. The internal construction of the collimator shown in FIG. 3 is also, with one exception, the same as the collimator shown in FIG. 2, and accordingly only this exception will be described here. Instead of being continuous, as it was in FIG. 2, surface 18 in this embodiment includes a substantially triangular trough 40 extending inwardly of the collimator along adhesive bonding joint 9. The depth of trough 40 is contemplated to be variable in accordance with the particular parameters of crystal size and angle of convergence desired, however, in each case this variability will be limited to such discreet steps as will result in a whole number of channels 23 and 24 respectively opening into trough 40.

Trough 40 has two substantially flat side surfaces, 42 and 46 respectively, which meet at an angle along adhesive bonding joint 9 such that surface 42 intersects the plane containing joint 9 at an angle equal to or greater than the angle at which that wall 20 which abuts the joint 9 adjacent to surface 18 intersects the plane containing the joint 9, and surface 46 intersects the plane containing joint 9 at an angle equal to or greater than the angle at which that wall 19 which abuts the joint 9 adjacent to surface 18 intersects the plane containing the joint 9. It will then be seen that the V-shaped area defined by those walls 19 and 20 which abut adhesive joint 9 adjacent surface 18 in FIG. 3 is smaller than the corresponding V-shaped area in FIG. 2, and that accordingly the separation between images formed on either side thereof will be smaller thereby allowing smaller crystals to be used and greater crystal utilization efficiencies to be attained than heretofore. Further, by defining the angle at which surfaces 42 and 46 meet as above, no part of collimating section 6 interferes with radiation from the radioactive object passing through the holes of collimating section 8 which open into surface 46, and no part of collimating section 8 interferes with radiation from the radioactive object passing through the holes of collimating section 6 which open into surface 42. Additionally, contrary to the effect after collimation between surface 16 and the crystal no problem arises due to interference caused by radiation rays crossing each other within trough 40, that is prior to collimation. We have, however, found that the image created by the collimator of FIG. 3 may not be uniform due to the fact that a larger number of rays which are not parallel to the walls of the channels can pass through the channels opening into surface 18 simply because the former channels are shorter than the latter. One way to correct for this nonuniformity is to line sides 42 and 46 of trough 40 with radiation absorbant material of such thickness that many of the spurious rays are absorbed yet enough of the desired rays pass through into the channels that the resulting image is substantially uniform. This is possible because spurious rays impinge upon the lining material at a greater angle relative to the axis of a channel than do the desired rays. Thus, assuming equivalent energy, it will be seen that spurious rays have to pass through more material than do desired rays and accordingly they may be absorbed while desired rays pass through. Obviously, depending upon the uniformity desired, this lining may be of uniform thickness, or the lining may taper in such a way that is thick over the openings to short channels and becomes thinner as channel length increases. Numerous other compensation means are also possible such as covering the open end of trough 40 with radiation absorbing material or placing rods of radiation absorbing material at various special locations within trough 40 to cut down the level of spurious radiation.

It should also be understood that while the drawings show collimators having square holes and wherein the angles of convergence of collimating sections 6 and 8 are chosen to be of equal value to the right and to the left in the same plane, this embodiment was chosen for conveniece and ease of understanding only and not in any way as limiting. The present invention contemplates specifically that hole size and shape may vary, that the angles of convergence of the respective collimating sections may be different and located in differing planes, and that more than two collimating sections may be present in the collimator described so long as sufficient section surface area and grid pattern is maintained in each section so that an undistorted, useable image may be created from the rays passing therethrough and the angle of convergence of the section is chosen so as not to interfere with the image derived from any other section.

In producing collimators in accordance with this invention, it has been found convenient to simply assemble the desired portion of a standard convergent/divergent collimator having the desired angle of convergence. Once such sections are formed they may be trimmed and oriented in the frame so that their respective angles of convergence are in the desired planes and they will not interfere with each other. The final unitary collimator structure is then formed by bonding the joints 9 between the sections and filling the areas 14 between the joined sections and the frame with lead or some other shielding material.

It should further be understood that the embodiments and practices described and portrayed herein have been presented by way of disclosure, rather than limitation, and that various substitutions, modifications and combinations may be effective without departure from the spirit and scope of this invention in its broader aspects. For example, the use of such collimators is specifically contemplated to extend beyond the above recited Anger camera example to scanners, solid state detectors, proportional counters, and other types of gamma and/or x-ray detectors.

We claim:

1. A collimator suitable for use in forming multiple, simultaneous images of a radioactive object upon a radiation sensitive member of a radiation receiving and imaging device, said collimator being formed of material opaque to radiation from said radioactive object, adapted for mounting between a radioactive object and the radiation sensitive member of a radiation receiving and imaging device, and comprising a top surface, a bottom surface, and at least two adjacent collimating sections separated by a bonding joint; each said collimating section being a grid-like arrangement of wall portions adapted to absorb substantially all radiation from said radioactive object which impinges thereon extending between said top surface and said bottom surface defining a plurality of holes therebetween so disposed relative to each other that the radiation from said object passing through said holes from said bottom surface to said top surface converges upon a focal point located on a line passing through the center of the top surface of the section, which line forms an acute angle with the perpendicular axis of the top surface of the section, said acute angle being so chosen that radiation which has passed through the holes of one section will not interfere with radiation which has passed through the holes of any other section.

2. The collimator of claim 1 wherein there are only two collimating sections, the value of the acute angle for both sections is chosen to be the same and both angles are located in the same plane.

3. The collimator of claim 2 wherein the value of the acute angles is chosen to be between 15° and 25°.

4. The collimator of claim 1 wherein the material opaque to radiation from the radioactive object is selected from the group consisting of lead, tungsten, tantalum, depleted uranium, and aluminum.

5. The collimator of claim 1 wherein the radiation receiving and imaging device is an Anger camera or simliar device.

6. The collimator of claim 1 wherein the bottom surface defines an open, substantially V-shaped trough extending inwardly of the collimator along the bonded joint between each pair of adjacent collimating sections; each said trough comprising a first substantially flat side surface associated with the first of the adjacent collimating sections and a second substantially flat side surface associated with the second of the adjacent collimating sections, each said side surface defining a whole number of openings into holes defined by the wall portions of the collimating section with which it is associated; said first and second side surfaces meeting at an angle along the bonding joint between their associated collimating sections, such that no portion of the first of said adjacent collimating sections interferes with radiation from the radioactive object passing through the holes of the second of the adjacent collimating section which open into the second side surface and no portion of the second of said adjacent collimating sections interferes with radiation from the radioactive object passing through the holes of the first of the adjacent collimating sections which open into the first side surface.

7. The collimator of claim 6 wherein the first and second side surfaces of the trough are covered with a layer of radiation absorbing material, thin enough to allow the passage of radiation convergent upon the focal points of the associated collimating sections respectively.

8. The collimator of claim 6 wherein the value of the acute angles are chosen to be between 15° and 45°.

* * * * *